June 27, 1944.　　　D. B. BROWNLOW　　　2,352,161
TESTING MACHINE
Filed Aug. 12, 1943　　　3 Sheets-Sheet 1

Inventor
David B. Brownlow
by
Seymour Earle Nichol
Attorneys

June 27, 1944.  D. B. BROWNLOW  2,352,161
TESTING MACHINE
Filed Aug. 12, 1943   3 Sheets-Sheet 2

Inventor
David B. Brownlow
by Seymour Earle
+ Nichols
Attorneys

June 27, 1944. D. B. BROWNLOW 2,352,161
TESTING MACHINE
Filed Aug. 12, 1943 3 Sheets-Sheet 3
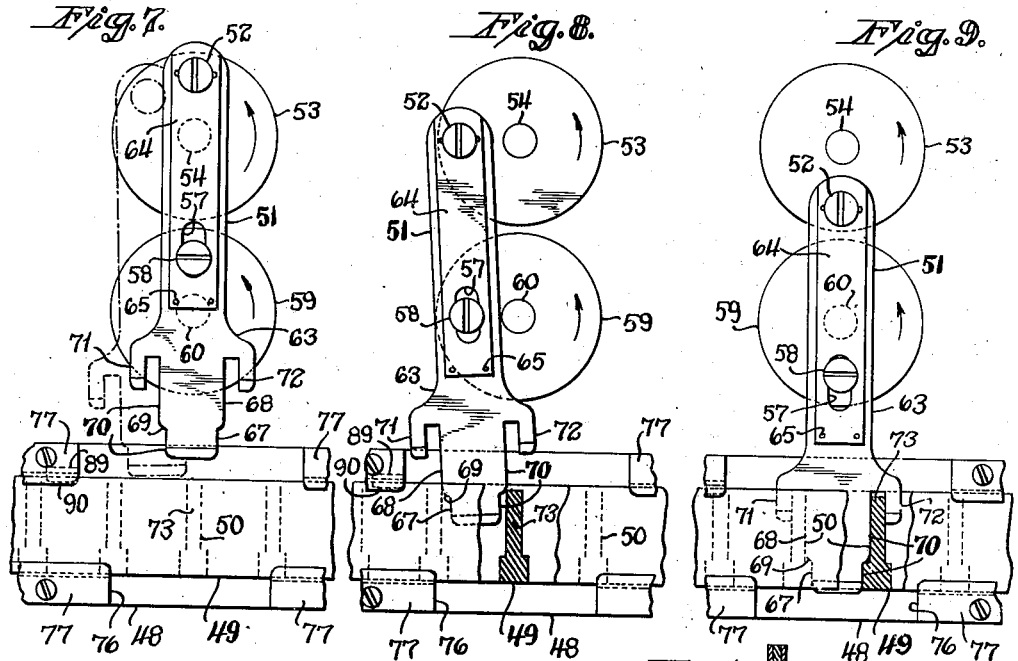
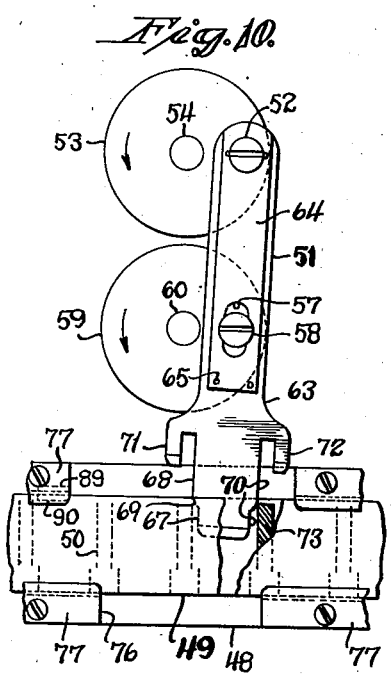
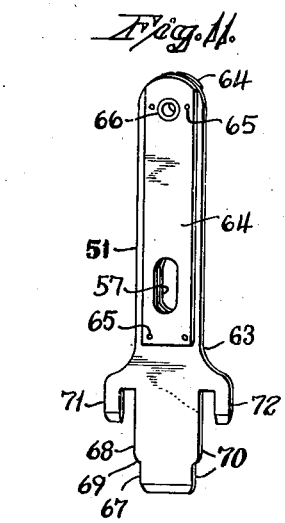
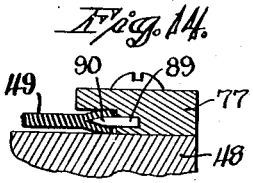
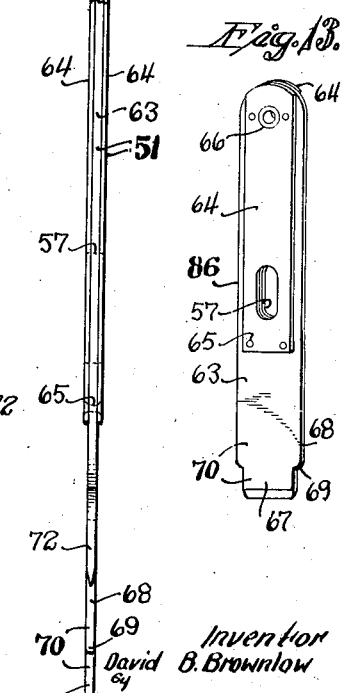
Inventor
David B. Brownlow
Seymour Earle & Nichols
Attorneys Patented June 27, 1944

2,352,161

UNITED STATES PATENT OFFICE 2,352,161

TESTING MACHINE

David B. Brownlow, Middletown, Conn., assignor to The Russell Manufacturing Company, Middletown, Conn., a corporation of Connecticut Application August 12, 1943, Serial No. 498,282

6 Claims. (Cl. 209—82)

This invention relates to improvements in testing machines for testing cartridge feed-belts for machine guns.

One object of this invention is to provide an improved machine for testing cartridge feed-belts for machine guns to ensure proper uniformity of size and spacing of the pockets of the belt.

With the above and other objects in view, as will appear to those skilled in the art from the present disclosure, this invention includes all features in the said disclosure which are novel over the prior art.

In the description and claims, the various parts and steps are identified by specific names for convenience, but they are intended to be as generic in their application as the prior art will permit.

In the accompanying drawings forming part of the present disclosure in which certain ways of carrying out the invention are shown for illustrative purposes:

Fig. 3 is a fragmental view on line 3—3 of Fig. 2 partly in section but mostly in elevation;

Fig. 4 is a view of the wiring diagram for the machine;

Figs. 7, 8, 9 and 10 are views similar to Fig. 1 of a fragmental portion thereof shown in different positions of a cycle of operation;

Fig. 11 is a perspective view of the belt-feeding and pocket-testing member;

Fig. 12 is a side-edge view on an enlarged scale of the belt-feeding and pocket-testing member;

Fig. 13 is a perspective view similar to Fig. 11 of a modified form of feeding-and-testing member; and Fig. 14 is a sectional view on line 14—14 of Fig. 1.

Figure 1:
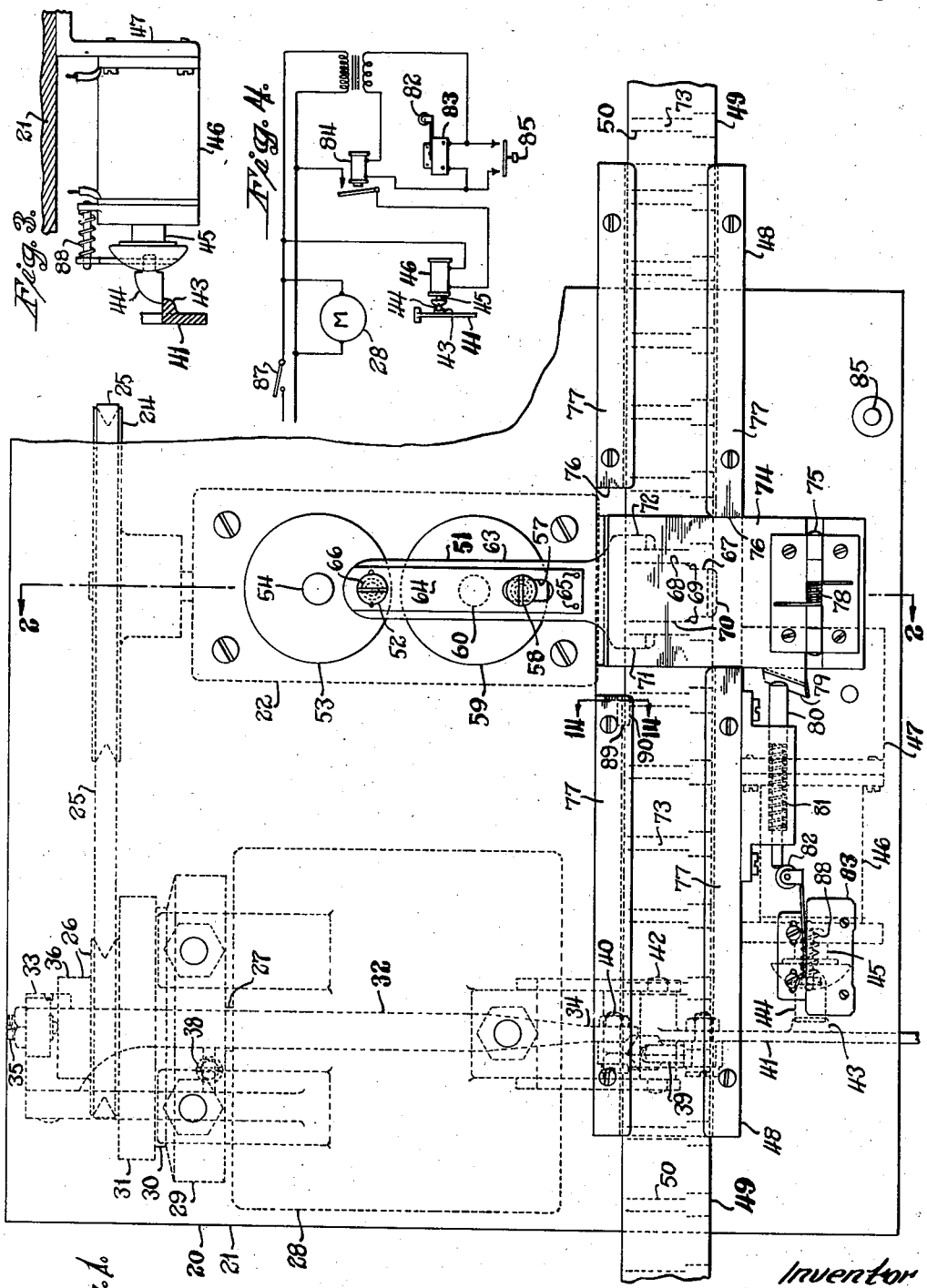
Fig. 1 is a top plan view of a machine for testing cartridge feed-belts for machine guns, made in accordance with the present invention.
Figure 2:
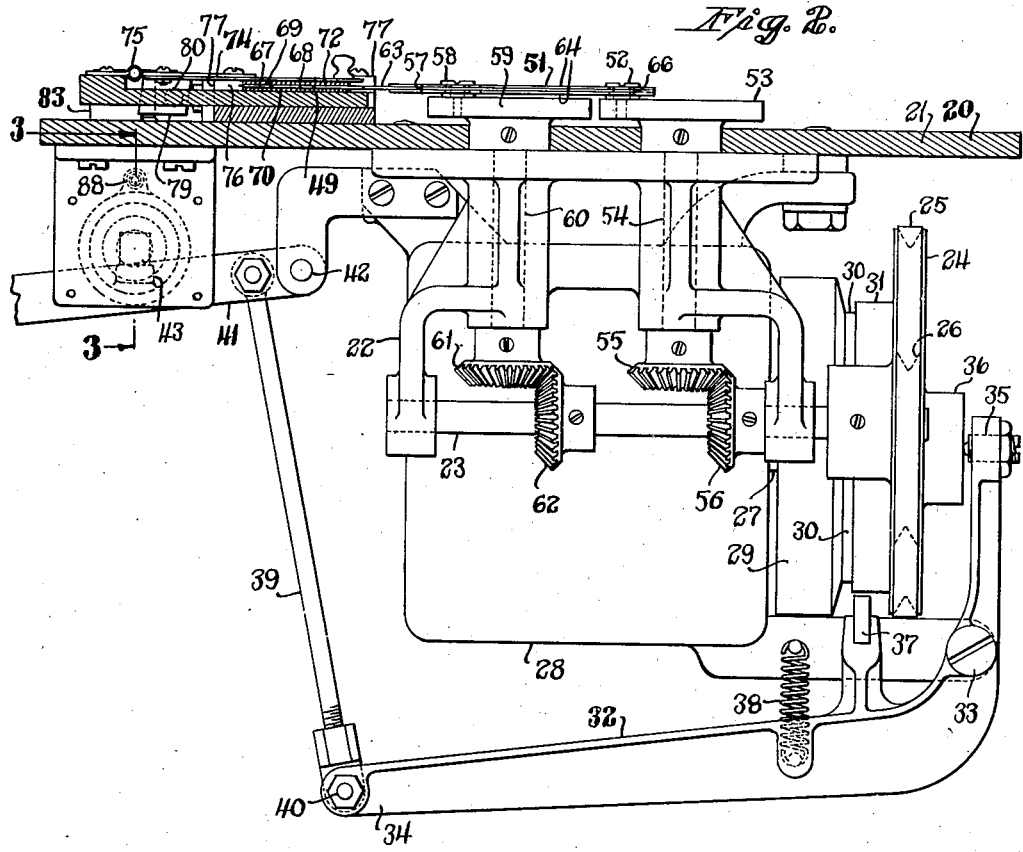
Fig. 2 is a sectional view on line 2—2 of Fig. 1.

In carrying out the invention in the particular way illustrated in Figs. 1 to 12 of the drawings, the testing machine 20 includes a support 21 which may be mounted upon a bench or table top. Mounted on the under-side of the support 21 is a frame 22 carrying a rotatably-mounted shaft 23 secured to which is a pulley 24 drivable by a belt 25 from a pulley 26 which is freely rotatable relatively to the shaft 27 of an electric drive-motor 28 except when it is clutched to the shaft 27 as hereinafter set forth. When the machine is to be used by an operator to test feed-belts, the electric circuit to the motor 28 and the other electrical parts to be later described, will be closed by any suitable switch 87, so that the motor runs continuously.

A plate or fly-wheel 29 is fixedly secured to the motor-shaft 27, and fixedly secured to the plate 29 is a friction clutch-facing 30 adapted to frictionally engage against the end-face of a brake-drum portion 31 of the pulley 26. A bell-crank lever 32 is pivoted at 33, and when its outer end 34 is swung downward, the ball-end screw 35 presses against the closed end of the hub portion 36 of the pulley 26 to thus push the pulley 26 with its clutch and brake-drum portion 31 against the clutch-facing 30 to thus cause the pulley 26 to be rotated by the motor 28. In this downward movement of the end 34 of the lever 32, the brake-shoe 37 carried on the lever 32 is moved downward away from the brake-surface of the brake-drum 31. When the end 34 of the bell-crank lever 32 is swung upward by any means, such for example as the spring 38, then the brake-shoe 37 is applied against the cylindrical brake-surface of the drum portion 31 and the ball-end screw 35 is swung away from the hub 36, thus releasing the pressure between the end face of the drum 31 and the friction clutch-facing 30 to thus stop the rotation of the pulley 26.

The end 34 of the bell-crank lever 32 is swung downward to brake-releasing and clutching-position by a rod 39 pivoted at one end at 40 to the end 34 of the lever 32, and at the other end to a starting-lever 41 pivotedly mounted at 42 to a portion of the frame 22. The starting-lever 41 has an integral latch-lug 43 adapted to be engaged by a latch 44 carried on a slidable solenoid-plunger 45 of a solenoid 46 which is carried on a bracket 47 secured to the support 21, the parts 43 and 44 being held engaged as shown in Fig. 3 by a compression spring 88.

Mounted on the top of the support 21 is a guide 48 through which the feed-belt 49 is adapted to travel. The feed-belt 49 has a succession of cartridge-receiving pockets 50 which are to be tested for proper size and spacing. A belt-feeding and pocket-testing member 51 is pivoted by screw 52 to a plate 53 fixedly secured to a shaft 54 having a bevel-gear 55 fixedly secured thereto and meshing with another bevel-gear 56 secured to the shaft 23. The feeding-and-testing member 51 also has a pivot-connection by means of a slot 57 with a pivot or screw 58 carried by a plate 59 fixedly secured to a shaft 60 to which is fixedly secured a bevel-gear 61 in mesh with another bevel-gear 62 fixedly secured to the shaft 23. Inasmuch as the pivot-screw 52 is further from the center of the plate 53 than the pivot-screw 58 is from the center of the plate 59, the feeding-and-testing member 51 will have a motion illustrated in various of its positions in a cycle shown in Figs. 7, 8, 9 and 10. Inasmuch as the feeding-and-testing member 51 has a component of movement relatively transversely edgewise of the belt 49, it can move into a pocket of the belt, as is illustrated in Figs. 7, 8 and 9, and inasmuch as it has a component of movement in the longitudinal direction of the belt, it also will feed or push the belt along longitudinally of itself, as will be evident from Figs. 7 to 10 inclusive. The plates 53 and 59 are driven at the same speeds of rotation. The feeding movement of the belt will be seen to be an intermittent movement, the movements taking place during the portion of travel of the member 51 shown in Figs. 8, 9 and 10, there being no feeding movement while the member 51 moves from its position shown in Fig. 10 back to its position shown in Fig. 7.

The feeding-and-testing member 51 is formed of a central or intermediate plate 63 of spring steel and having two outside stiffening-and-wear plates 64 riveted thereto by the rivets 65. A bronze bushing 66 forms a suitable anti-friction pivot for pivoting on the pivot-screw 52. The central plate 63 has a relatively-small end-portion 67 and a relatively-wider portion 68 with fairly blunt curved connecting-portions 69. The portions 67 and 68 constitute a main or primary feeding-and-testing finger 70. The central plate 63 also has two supplemental or secondary fingers 71 and 72 spaced away from the main or primary finger 70. When the wide portion 68 of the main finger 70 enters a pocket which is of proper size, the finger moves down into the pocket with a proper degree of friction but without crumpling the pocket. But if the pocket is too small, so that it has too tight a fit with the wide portion 68 of the finger 70, then as the finger 70 moves into such undersized pocket, it crumples the pocket somewhat after the manner illustrated in Fig. 6. Also, if the pocket is too big, so that the wide portion 68 slides in more freely than it should, then the pocket will be so large that one or the other, or both, of the secondary testing-fingers 71, 72 will engage against the outer edge of a junction area 73 where the two plies of the belt are joined together between each two successive pockets, and thus will crumple the belt at this location in a manner somewhat similar to that illustrated in Fig. 6. Another defect which sometimes occurs in weaving of machine-gun belts is that instead of all of the cross-over threads being properly located in the crossover-area 73, some threads, due to defects in the weaving operation, will extend out into the free pocket area where they should not be, and the finger 70 will engage such threads and crumple the belt at such location.

Figure 5:
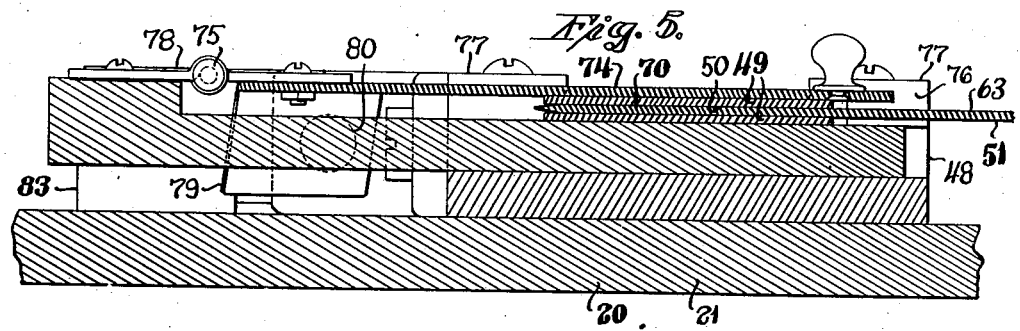
Fig. 5 is a view similar to Fig. 2 of a fragmental portion thereof on an enlarged scale.
Figure 6:
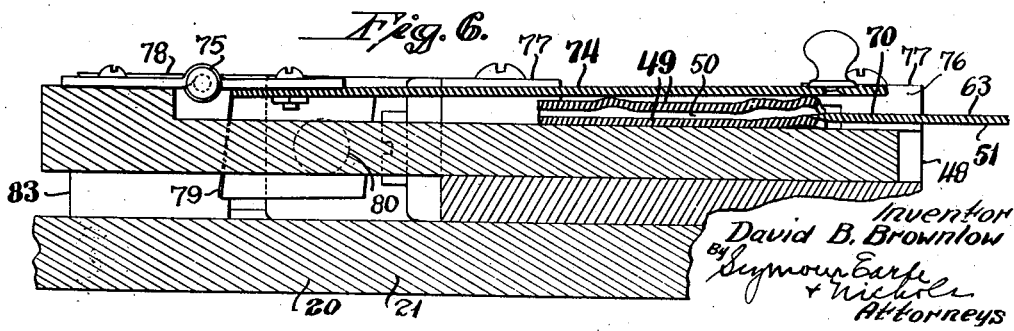
Fig. 6 is a view similar to Fig. 5 showing the action which occurs when a defective pocket is encountered.

In order to identify each defective pocket which crumples under the testing-and-feeding action of the member 51, a plate 74 is pivoted or hinged at 75 and is normally held down in the position shown in Fig. 5 close to the top surface of the belt 49 within a space 76 between two guide-members 77 of the guide 48 by means of a spring 78, in addition to the weight of the member 74. Carried on the plate 74 is a cam-member 79 adapted to push the rod 80 against the action of the spring 81 by a small swinging movement of the plate-member 74 upward a small distance such as it would be moved as shown in Fig. 6 by a crumpled portion of the belt 49. When this small upward movement of the plate 75 occurs and thus pushes the rod 80 to the left of Fig. 1, it engages against the roller 82 of a micro-switch 83 to thus close a low-voltage circuit through a relay 84 (Fig. 4) to thus close the main high-voltage circuit which may, for example, be the usual alternating-current 110 volt circuit, through the solenoid 46 to thus pull the latch 44 away from the latching-lug 43 of the starting-lever 41 against the action of the spring 88, to thus permit the spring 38 to swing the lever 32 to unclutch the drive from the motor from the drive-pulley 26 and apply the brake-shoe 37 to the brake-drum 31 to thus quickly stop the machine with the crumpled pocket-portion of the belt in substantially the position that it was in when it pushed the plate 74 upward. The operator then lightly pushes the starting-lever 41 down until the electric motor 28 is clutched in driving-relation with the pulley 26, but without engaging the latch 44, until the mechanism moves the feeding-and-testing member 51 out of the defective pocket to a position such as that shown in Fig. 7, whereupon the belt portion containing the defective pocket can be readily removed from the guide 48 and the operator can cut the portion of the belt to the right of the defective pocket so that all of the belt that has gone through the machine to the point of the crumpled pocket constitutes a length of feed-belt that has been tested properly. The crumpled pocket can then be cut off by scissors, knife, or other suitable means, and the remaining portion of the untested belt can be replaced in the guide 48 with a pocket in proper position, so that when the pivoted plate 74 is swung down to the position shown in Fig. 5 and starting-lever 41 is pushed down to latched position, the machine will be started and cause the main finger 70 to enter the properly positioned pocket and intermittently feed the feed-belt longitudinally of itself and test the cartridge-receiving pockets thereof until a defective pocket is encountered and crumpled to thus stop the feed of the feed-belt as previously described. If the operator desires, at any time while it is running, to stop the machine, he can do so by pressing upon the push-button switch 85 which closes the low-voltage circuit through the relay 94.

When the feed-belt 49 which is being tested, has its two plys unconnected along its forward edge to provide what may be called a V-edge, a knife-like edge-opener 89 is employed which has a force-fit in a slot in one of the guide-members 77 and has its edge-portion 90 projecting into the path of travel of the forward edge of the feed-belt 49 so as to open out the forward V-edge of the feed belt 49 as shown in Fig. 14 to ensure the proper entry of the end portion 67 of the feeding-and-testing finger 70 into the pockets of the feed-belt. The edge-opener 89 is preferably made of tempered tool steel and preferably is chromium plated and the plating is polished to thus produce a surface which has a low coefficient of friction and which also resists wear produced by the rubbing action of the fabric of the feed-belt against it.

After the feeding-and-testing member 51 is completely made as illustrated in Figs. 11 and 12, the finger-end portion including fingers 70, 71 and 72 and extending back to beyond any part that would be engageable in the fabric of the pocket, is chromium plated and the plating is polished to thus produce a surface which has a low coefficient of friction and which also resists wear produced by the rubbing action of the fabric of the feed-belt against it.

The modified form of feeding-and-testing member 86 shown in Fig. 13 is the same as the feeding-and-testing member 51 except that it has no secondary testing fingers.

The invention may be carried out in other specific ways than that herein set forth without departing from the spirit and essential characteristics of the invention, and the present embodiment is, therefore, to be considered in all respects as illustrative and not restrictive, and all changes coming within the meaning and equivalency range of the appended claims are intended to be embraced therein.

I claim:

1. A machine for testing cartridge feed-belts for machine guns, including: means for feeding a cartridge feed-belt longitudinally of itself; pocket-testing means movable relatively-transversely edgewise of the belt to test the size of each pocket and to crumple each pocket that is undersize; and means actuated by each crumpled pocket for identifying each such crumpled pocket.

2. A machine for testing cartridge feed-belts for machine guns, including: means for feeding a cartridge feed-belt longitudinally of itself; pocket-testing means movable relatively-transversely edgewise of the belt to test the size of each pocket and to crumple each pocket that is undersize; and means actuated by each crumpled pocket for stopping the feed of the belt.

3. A machine for testing cartridge feed-belts for machine guns, including: belt-feeding and pocket-testing means having a component of movement for feeding a cartridge feed-belt longitudinally of itself and a component of movement relatively-transversely edgewise of the belt to test the size of each pocket and to crumple each pocket that is undersize; and means actuated by each crumpled pocket for identifying each such crumpled pocket.

4. A machine for testing cartridge feed-belts for machine guns, including: belt-feeding and pocket-testing finger-means adapted to enter each proper-size pocket and having a component of movement for feeding a cartridge feed-belt longitudinally of itself and a component of movement relatively-transversely edgewise of the belt to test the size of each pocket and to crumple each pocket that is undersize; and means actuated by each crumpled pocket for identifying each such crumpled pocket.

5. A machine for testing cartridge feed-belts for machine guns, including: belt-feeding and pocket-testing finger-means adapted to enter proper-size pockets and including a primary feeding-and-testing finger and a secondary testing-finger, said primary finger having a component of movement for feeding a cartridge feed-belt longitudinally of itself and said primary and secondary fingers having a component of movement relatively-transversely edgewise of the belt to test the size of each pocket and to crumple each pocket that is undersize or oversize; and means actuated by each crumpled pocket for identifying each such crumpled pocket.

6. A machine for testing cartridge feed-belts for machine guns, including: belt-feeding and pocket-testing finger-means adapted to enter proper-size pockets and including a primary feeding-and-testing finger, and two secondary testing fingers, one on each of opposite sides of the primary finger, said primary finger having a component of movement for feeding a cartridge feed-belt longitudinally of itself and said primary and secondary fingers having a component of movement relatively-transversely edgewise of the belt to test the size of each pocket and to crumple each pocket that is undersize or oversize; and means actuated by each crumpled pocket for identifying each such crumpled pocket.

DAVID B. BROWNLOW.